United States Patent [19]

Takiyama et al.

[11] 3,882,187
[45] May 6, 1975

[54] RADIATION CURABLE EPOXY ESTER-SATURATED ALKYD COMPOSITIONS

[75] Inventors: Eiichiro Takiyama, Kamakura; Sadakazu Hokamura, Kamato; Toshiaki Hanyuda, Yokohama, all of Japan

[73] Assignee: Showa High Polymer Co., Ltd., Tokyo, Japan

[22] Filed: Nov. 21, 1973

[21] Appl. No.: 417,760

Related U.S. Application Data

[63] Continuation of Ser. No. 224,917, Feb. 9, 1972, abandoned.

[30] Foreign Application Priority Data

Feb. 10, 1971  Japan................................ 46-5254

[52] U.S. Cl. ........ 260/835; 117/93.31; 204/159.15; 204/159.19; 260/836; 260/837 R
[51] Int. Cl........................ C08g 39/10; C08g 45/14
[58] Field of Search................. 204/159.15, 159.19; 260/837 R, 835, 836

[56] References Cited
UNITED STATES PATENTS

| | | | |
|---|---|---|---|
| 3,301,743 | 1/1967 | Fekete et al. | 260/837 |
| 3,506,736 | 4/1970 | Najvar | 260/837 |
| 3,586,529 | 6/1971 | Aronoff et al. | 260/837 |

*Primary Examiner*—Murray Tillman
*Assistant Examiner*—Richard B. Turer
*Attorney, Agent, or Firm*—Wenderoth, Lind & Ponack

[57] ABSTRACT

The present invention relates to an unsaturated epoxy-ester resinous composition curable under irradiation by an electron beam to form a coating film exhibiting excellent dryness and adhesiveness on the surface of the coated metal. The epoxy-ester resinous composition comprises: a reaction product of:

a. one equivalent weight of an epoxy compound having at least two epoxy radicals in the molecule, b. 0.5 equivalent weight of an unsaturated monocarboxylic acid, and c. 0.5 equivalent weight of a saturated alkyd which has a terminal carboxyl radical in the molecule and is produced by heating one mole of a glycol with 1.33 to 2.0 moles of a saturated dicarboxylic acid, said reaction product being produced under heating and in the presence of an esterification catalyst and with or without a polymerization inhibitor, solvent, polymerizable monomer or additional solvent.

5 Claims, No Drawings

RADIATION CURABLE EPOXY ESTER-SATURATED ALKYD COMPOSITIONS

This is a continuation of application Ser. No. 224,917, filed Feb. 9, 1972, now abandoned.

DETAILED EXPLANATION OF INVENTION

This invention relates to an unsaturated epoxyester resinous composition which is curable in air under irradiation by radiant rays such as an electron beam and can be used for the preparation of paints having an excellent quality.

Also, this invention relates to a cured product which is produced by exposing the unsaturated epoxy-ester resinous composition to a radiation of the radiant rays such as the electron beam.

Heretofore, there are proposed various kinds of resinous compositions which are curable under irradiation by an electron beam and it is known that the curability of such resinous compositions depends upon a radical polymerization and therefore most resinous compositions are made by using an unsaturated polyester resin. When such an irradiation-curing technique is compared with another curing technique in which an organic peroxide or a light-sensitive material is used, it is found that the former curing technique requires a few seconds but the latter curing technique requires a few minutes or hours and therefore that the irradiation-curing technique can improve the workability of the resinous composition. The unsaturated polyester resin, however, has such a defect as that it is poor in dryness when it is cured in air. Therefore, the unsaturated polyester resin must be cured by using high irradiation energy or using a wax-layer disposed on the surface of an unsaturated polyester resin film formed on a substrate in order to prevent an oxygen-action of inhibiting the polymerization of the unsaturated polyester resin or using an atmosphere of inert gases such as a nitrogen gas. Also, in general, the unsaturated polyester resin is frequently poor in adhesion to a substrate and therefore it can be used for forming a coating film on a relatively porous wood but it is not suitable for coating a metal.

We, the inventors have investigated various kinds of resinous compositions which are cured under irradiation by an electron beam and can be used for coating a metal without using any wax to produce a coating layer having good adhesiveness. As the results, we have found that the object of this invention can be achieved by providing an unsaturated epoxy-ester resinous composition which is produced by using an epoxy compound, an unsaturated monocarboxylic acid and an alkyd having the terminal carboxyl radical or radicals in the molecule.

Now, certain kinds of unsaturated epoxy-ester resinous compositions which contain a polymerizable monomer are disclosed in Japanese Pat. Nos. 31472/1969, 15988/1970 and 40069/1970, and a copending Japanese application No. 14702/1967. We have newly found the fact that such unsaturated epoxy-ester resinous compositions can be cured under the irradiation of an electron beam by using low irradiation energy as compared with the usual unsaturated polyester resin having the unsaturation derived from fumarate or maleate and also that they can be satisfactorily used for coating a metal to produce a coating film having good adhesiveness.

We have found that an unsaturated epoxy-ester resin, which is produced by using "Epikote-828" and methacrylic acid, can be cured with 8 mega-rads and also that an unsaturated epoxy-ester resin, which is produced by using "Epikote-828" methacrylic acid and methyl-tetrahydrophthalic acid anhydride, can be cured with 3.5 mega-rads. Therefore, we have found that an unsaturated epoxy-ester resin modified with an alkyd having the terminal carboxyl radical or radicals in the molecule can be improved in responsiveness to radiation by an electron beam and cured in air to produce on a substrate a coating film which has excellent adhesiveness but no tackiness.

In accordance with the method of this invention, the unsaturated epoxy-ester resinous composition can be produced by reacting an epoxy compound having one or more epoxy radicals in the molecule with an unsaturated monocarboxylic acid and a saturated or unsaturated alkyd having the terminal carboxyl radical or radicals of 1 to 4 in the molecule, under heating by using an esterification catalyst, and if desired in the presence of a polymerization inhibitor, a solvent or a polymerizable monomer, and also if desired by adding an additional polymerizable monomer or solvent. In this case, it is noted that the unsaturated monocarboxylic acid and the epoxy compound having one or more epoxy radicals in the molecule are used in a ratio of the carboxylic radicals to the epoxy radicals of 0.2 – 2.0 : 1 and preferably 0.4 – 1.8 : 1, and also that the amount of the polymerization inhibitor, the solvent or the polymerizable monomer is varied depending upon the curability, workability and quality of the unsaturated epoxy-ester resinous composition to be desired.

The epoxy compounds used in this invention are classified as follows:

1. Epoxy compounds which are produced by reacting a bis-phenol A with epichlorohydrine and indicated by the formula:

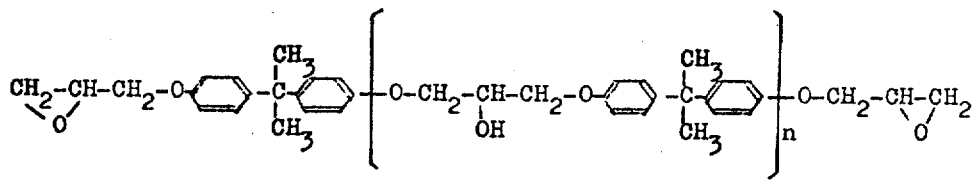

Examples of such epoxy compounds are listed as follows;

| Makers | Trade names | Melting point (°C) | Viscosity at 25°C (poise) | Epoxy-equivalent | Molecular weight (approximate) |
|---|---|---|---|---|---|
| Shell | Epikote– 827 | Liquid | 90 – 110 | 180 – 190 | — |
| | – 828 | Liquid | 120 – 150 | 184 – 194 | 380 |
| | – 834 | Liquid | — | 230 – 270 | 470 |
| | –1001 | 64 – 74 | — | 450 – 500 | 900 |
| | –1004 | 96 –104 | — | 900 –1000 | 1400 |

2. Epoxy compounds which are produced by reacting a bis-phenol A with methyl epichlorohydrine and indicated by the formula:

4. Epoxy compounds which are produced by reacting glycols with epichlorohydrine and indicated by the formula:

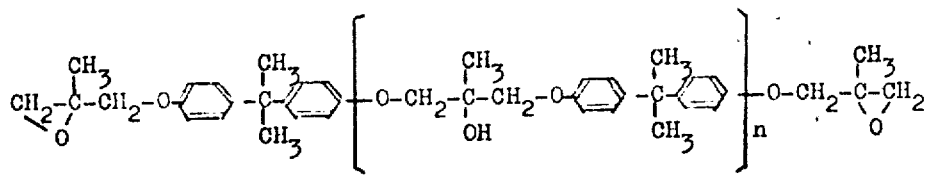

Examples of such epoxy compounds are listed as follows:

| Makers | Trade names | Melting point (°C) | Viscosity at 25°C (poise) | Epoxy-equivalent |
|---|---|---|---|---|
| Dai-nihon-Inki | Epiclon– 800 –1000 | Liquid 63–75 | 250–750 — | 195–225 450–525 |

3. Epoxy compounds which are produced by oxidizing a double bond of an unsaturated compound and classified into "Unox-221" having the formula of

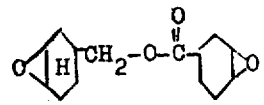

(liquid, viscosity =4.5 – 6.0 poises at 25°C and epoxy-equivalent=134 – 140) and "Unox-289" having the formula of

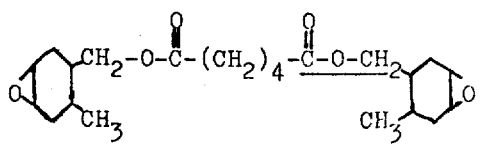

(liquid, viscosity= 8.5 – 9.5 poises at 25°C and epoxy-equivalent=216 – 222) which are the Trade names and sold by Union Carbide Company.

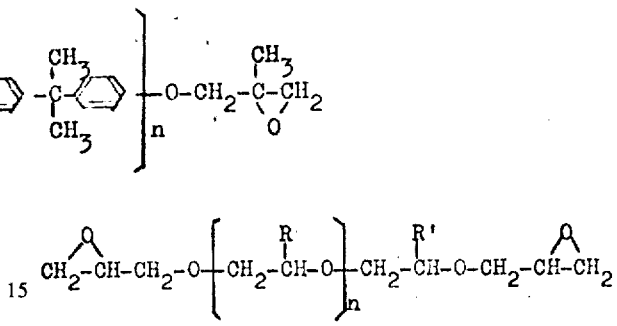

Examples of such epoxy compounds are DER-732 (epoxy-equivalent=305 – 335 and $n=5.6$) and DER-736 (epoxy-equivalent=175 – 205 and $n=3.0$) which is the Trade name and sold by Dow Chemical Co.

5. Epoxy compounds which are produced by reacting an adduct of bisphenol A and ethylene oxide or propylene oxide with epichlorohydrine and indicated by the formula:

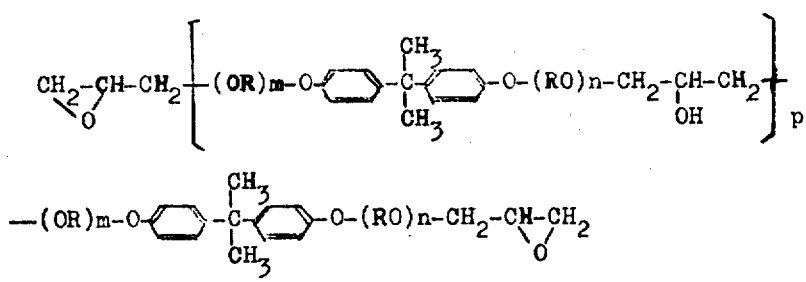

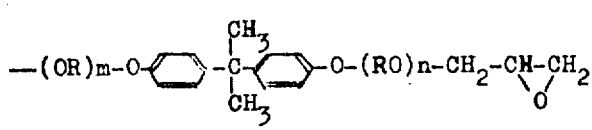

Examples of such epoxy compounds are "Adeka FP-4000" and "Adeka FP-4001" which are the Trade names and sold by Asahi Denka in Japan. The "Adeka FP-4000" is a liquid and has a viscosity of 30 to 40 poises at 25°C and an epoxy-equivalent of 330 to 360, and the "Adeka FP-4001" is a liquid and has a viscosity of 50 to 60 poises at 25°C and an epoxy-equivalent =250 – 280.

6. Epoxy compounds which are produced by reacting carboxylic acids with epichlorohydrine or methyl epichlorohydrine and indicated by the formula:

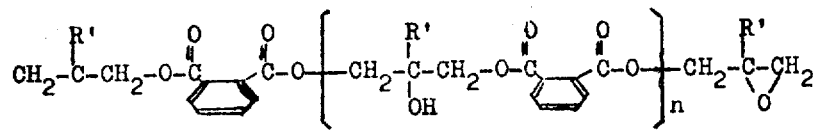

Examples of such epoxy compounds are listed as follows:

| Makers | Carboxylic acids | Trade names | State of | Viscosity at 25°C (poise) | Epoxy-equivalent |
|---|---|---|---|---|---|
| Showa-Denko | Phthalic acid | Shodine–508 | Liquid | 30–50 | 190–200 |
| Dai-nihon-Inki | Phthalic acid | Epiclon–200 | Liquid | 13–45 | 160–200 |
| | Methyl-tetra-hydrophthalic acid anhydride | Epiclon–300 | Liquid | 7.7 | 180–200 |
| | Hexahydro-phthalic acid anhydride | Epiclon–400 | Liquid | 4.5–10 | 170–210 |

7. Epoxy compounds which are produced by reacting halogenated bis-phenol with epichlorohydrine and indicated by the formula:

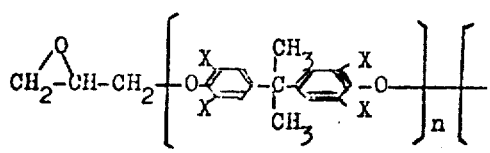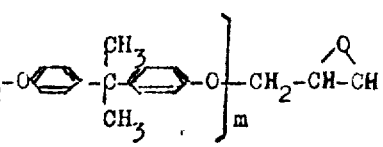

Examples of such epoxy compounds are listed as follows:

| Makers | Trade names | Melting point (°C) | Viscosity at 70°C (poise) | Epoxy-equivalent | Bromine (%) |
|---|---|---|---|---|---|
| Ciba | Araldite-8011 | 70–80 | — | 455–500 | 19–23 |
| | 8047 | — | 3.5 | 223–246 | 18–22 |

Further, it is noted that a diglycidyl ester of hexahydrophthalic acid or adipic acid can be used in this invention.

The unsaturated monocarboxylic acid used in this invention includes, for example, acrylic acid, methacrylic acid, sorbic acid and crotonic acid. It is possible to use a monoester of the unsaturated polycarboxylic acid such as a mono-ethylester of maleic acid in an amount not degrading the quality of the unsaturated epoxy-ester resinous composition.

It is noted that the saturated and unsaturated alkyds having the terminal carboxyl radical or radicals of 1 to 4 can be produced by reacting a saturated or an unsaturated polycarboxylic acid with a glycol by using the usual prior known technique.

Examples of the saturated or unsaturated polycarboxylic acids and their anhydrides used in this invention are succinic acid, adipic acid, sebasic acid, maleic acid, fumaric acid, maleic acid anhydride, citraconic acid, itaconic acid, tetrahydrophthalic acid, tetrahydro-phthalic acid anhydride, methyl-tetrahydrophthalic acid, methyl-tetrahydrophthalic acid anhydride, hexahydro-phthalic acid, hexahydrophthalic acid anhydride, endomethylene tetrahydrophthalic acid anhydride, phthalic acid and phthalic acid anhydride. It is noted that such polycarboxylic acids and such polycarboxylic acids anhydrides can be used alone or in combination thereof.

Examples of the typical glycols are propylene glycol, ethylene glycol, butane-diol-1,3, butane-diol-2,3, butane-diol-1,4, neopentyl glycol, hexane-diol-1,6, diethylene glycol, triethylene glycol, dipropylene glycol and hydrogenated bisphenol A.

The esterification catalyst used in this invention includes secondary and tertiary amines, and their inorganic or organic acid salts such as diethylamine hydrochloride, triethylamine, diethylamine acetate and benzyl-methylamine, a potassium or sodium salt of phthalic acid; metal halides such as lithium bromide, lithium chloride, chromium chloride and zinc chloride; quaternary ammonium salts, phosphonium salts and sulfonium salts. It is noted that such an esterification catalyst can be used in an amount of from 0.005 to 5 weight parts per 100 weight parts of the unsaturated epoxy-ester resinous composition.

The polymerization inhibitor used in this invention includes phenols, quinones and copper salts such as hydroquinone, methyl-hydroquinone, benzoquinone and copper chloride.

Example of the polymerizable monomers used in this invention are esters of acrylic acid and methacrylic acid such as ethylacrylate, butylacrylate, methyl-methacrylate, ethyl-methacrylate, butyl-methacrylate, isobutyl-methacrylate, hydroxy-ethylmethacrylate, hydroxy-ethylacrylate and hydroxypropylmethacrylate; acrylonitrile; vinyl acetate; aromatic monomers such as styrene and vinyl toluene; polyhydric alcohol esters of acrylic acid and methacrylic acid such as ethylene glycol-diacrylate, ethylene glycol-dimethacrylate, trimethylol-propane-trimethacrylate, diethylene glycol-dimethacrylate, diethylene glycol-diacrylate and butane-diol-dimethacrylate.

It is noted that the unsaturated epoxy-ester resinous compositions of this invention may be mixed with reinforcing materials and inorganic or organic fillers.

This invention is illustrated by the following Examples but this invention is not limited to or by the Examples.

EXAMPLE 1

A saturated alkyd having the terminal carboxyl radicals and an acid value of 108 was prepared by heating an admixture of 159 grams (1.5 moles) of diethylene glycol and 332 grams (2.0 moles) of tetrahydrophthalic acid anhydride in a carbon dioxide gas stream at 180°C for about 6 hours.

Then 510 grams (one equivalent) of the saturated alkyd, 374 grams (two equivalents) of Shodine-508 which is a diglycidylphatate and has an epoxy-equivalent of 187, 72 grams (one equivalent) of acrylic acid, 3 grams of diethylamine hydrochloride (an esterification catalyst) and 0.4 gram of hydroquinone were charged into a flask equipped with a stirrer, a refluxing condenser and a thermometer, and then the resultant mixture was heated at 120°C for about 180 minutes under agitation to produce a reaction product having an acid value of 25. The reaction product was cooled and then it was mixed with styrene to produce an unsaturated epoxy-ester resinous composition (A) containing a 35 weight % of styrene.

A steel plate was coated with the unsaturated epoxy-ester resinous composition (A) to have a layer having a 50 μ thickness and the layer was exposed in air to a radiation of 5 mega-rads, 10 mega-rads or 15 mega-rads by using a Vande Graaff Electronic Accelerator manufactured by Highvoltage Engineering Company in U.S.A. It was found that the layer lost its tackiness and has a pencil hardness of H to 2H. Also the layer was tested for adhesiveness in accordance with the specification disclosed in the "National Coil Coater's Association." The test results are given in the following Table 1.

Table 1

| | 5 mega-rads | 10 mega-rads | 15 mega-rads |
|---|---|---|---|
| Pencil hardness | H | 2H | H |
| Test on squares | 100/100 | 100/100 | 100/100 |
| Bending test at an angle of 180° | Pass | Pass | Pass |
| Cross-cut Erichsen test | above 8 mm | above 8 mm | above 8 mm |

EXAMPLE 2

The reaction product, which was prepared in Example 1, was mixed with benzene to produce an unsaturated epoxy-ester resinous composition (B) containing a 30 weight % of benzene.

A steel plate was coated with the unsaturated epoxy-ester resinous composition (B) to have a layer having a 50 μ thickness and the layer was placed in air for 30 minutes at room temperature. Then the layer was exposed in air or a nitrogen gas to a radiation of 5 mega-rads or 10 mega-rads by using a Vande Graaff Electronic Accelerator used in Example 1. It was found that the layer lost its tackiness and has a pencil hardness of F to H. Also the layer was tested for adhesiveness as in Example 1. The test results are given in the following Table 2.

Table 2

|  | In air | | In Nitrogen gas | |
| --- | --- | --- | --- | --- |
|  | 5 mega-rads | 10 mega-rads | 5 mega-rads | 10 mega-rads |
| Pencil hardness | F | H | F | F |
| Test on squares | 100/100 | 100/100 | 100/100 | 100/100 |
| Bending test at an angle of 180° | Pass | Pass | Pass | Pass |
| Cross-cut Erichsen test | above 8 mm | above 8 mm | above 8 mm | above 8 mm |

EXAMPLE 3

A saturated alkyd having the terminal carboxyl radicals and an acid value of 160 was prepared by heating an admixture of 52 grams (0.5 mole) of neopentyl glycol, 53 grams (0.5 mole) of diethylene glycol and 249 grams (1.5 moles) of methyl tetra-hydrophthalic acid anhydride in the same manner as in Example 1.

The 350 grams (one equivalent) of the saturated alkyd, 320 grams (two equivalents) of Shodine-710 having an epoxy equivalent of 160, 72 grams (one equivalent) of acrylic acid, 2.7 grams of triethylamine (an esterification catalyst) and 0.3 gram of hydroquinone ( a polymerization inhibitor) were charged in a reaction vessel and heated in the same manner as in Example 1 to produce a reaction product having an acid value of 15. The reaction product was cooled and then it was mixed with toluene to produce an unsaturated epoxy-ester resinous composition (C) containing a 25 weight % of toluene.

A steel plate was coated with the unsaturated epoxy-ester resinous composition (C) to have a layer having a 25 μ thickness and the layer was exposed to a radiation of 5 mega-rads or 10 mega-rads in the same manner as in Example 2.

It was found that the layer lost its tackiness and has a pencil hardness of F to HB. Also the layer was tested for adhesiveness as in Example 1. The test results are given in the following Table 3.

Table 3

|  | 5 mega-rads | 10 mega-rads |
| --- | --- | --- |
| Pencil hardness | F to HB | F |
| Test on squares | 100/100 | 100/100 |
| Bending test at an angle of 180° | Pass | Pass |
| Cross-cut Erichsen test | above 8 mm | above 8 mm |

EXAMPLE 4

A saturated alkyd having the terminal carboxyl radicals and an acid value of 204 was prepared by heating an admixture of 240 (1 mol) grams of hydrogenated bisphenol A, and 308 grams (2 mols) of hexahydrophthalic acid anhydride in a carbon dioxide gas stream at a temperature of 180° to 190°C for 5 hours.

Then 540 grams (4 equivalents) of the saturated alkyd were mixed with 690 grams (4 equivalents) of hexahydrophthalic acid anhydride-diglycidylester having an epoxy equivalent of 172, 145 grams of acrylic acid, 5 grams (2 equivalents) of diethylamine hydrochloride and 0.5 gram of hydroquinone, and then the resulting mixture was heated at a temperature of 120° to 125°C to produce a viscous product. The viscous product became difficult to agitate as the chemical reaction goes on and therefore the viscous product was mixed with 200 grams of styrene and then the resulting mixture was heated at a temperature of 120° to 125°C for 2.5 hours to produce a reaction product having an acid value of below 15. The reaction product was cooled and then it was mixed with 300 grams of styrene to produce an unsaturated epoxy-ester resinous composition (E). The unsaturated epoxy-ester resinous composition (E) was tested for curability and dryness in the same manner as in Example 1 and it was found that the resinous layer became a gel after it was irradiated with one mega-rad and also that the resinous layer lost it tackiness after it was exposed to a radiation of 3 mega-rads.

What is claimed is:

1. An unsaturated epoxy-ester resinous composition curable under electron beam radiation to form a coating film with excellent dryness and adhesion to metals, which composition comprises: a reaction product of
   a. one equivalent weight of an epoxy compound having at least two epoxy radicals in the molecule,
   b. 0.5 equivalent weight of an unsaturated monocarboxylic acid, and
   c. 0.5 equivalent weight of a saturated alkyd which has a terminal carboxyl radical in the molecule and is produced by heating one mole of a glycol with 1.33 to 2.0 moles of a saturated dicarboxylic acid, said reaction product being produced under heating and in the presence of an esterification catalyst and with or without a polymerization inhibitor, solvent, polymerizable monomer selected from the group consisting of ethylacrylate, butylacrylate, methylmethacrylate, ethylmethacrylate, butylmethacrylate, isobutylmethacrylate, hydroxy-ethylmethacrylate, hydroxy-ethylacrylate, hydroxy-propylmethacrylate, acrylonitrile, vinyl acetate, styrene, vinyl toluene, ethylene glycol-diacrylate, ethylene glycol-dimethacrylate, trimethylol-propane-trimethacrylate, diethylene glycol-dimethacrylate, diethylene glycol-diacrylate and butanediol-dimethacrylate, or additional solvent.

2. An unsaturated epoxy-ester resinous composition according to claim 1, wherein the epoxy compound is produced by at least one method selected from the group consisting of: (a) reacting bisphenol-A with epichlorohydrin or methylepichlorohydrin; (b) oxidizing a double bond of the unsaturated compound; (c) reacting a glycol with epichlorohydrin; (d) reacting an adduct of bisphenol-A and ethylene oxide or propylene oxide with epichlorohydrin; (e) reacting a carboxylic acid with epichlorohydrin or methylepichlorohydrin; and (f) reacting halogenated bisphenol-A with epichlorohydrin.

3. An unsaturated epoxy-ester resinous composition according to claim 1, wherein the unsaturated monocarboxylic acid is selected from the group consisting of acrylic acid, methacrylic acid, sorbic acid, crotonic acid and the mono-ethylester of maleic acid.

4. An unsaturated epoxy-ester resinous composition according to claim 1, wherein the glycol is selected from the group consisting of propylene glycol, ethylene glycol, butane-diol-1,3, butane-diol-2,3, butane-diol-1,4, neopentyl glycol, hexane-diol-1,6, diethylene glycol, triethylene glycol, dipropylene glycol and hydrogenated bisphenol-A.

5. An unsaturated epoxy-ester resinous composition according to claim 1, wherein the saturated dicarboxylic acid is selected from the group consisting of succinic acid, adipic acid, sebacic acid, tetrahydrophthalic acid, tetrahydrophthalic anhydride, methyl-tetrahydrophthalic acid, methyl-tetrahydrophthalic anhydride, hexahydrophthalic acid, hexahydrophthalic anhydride, endomethylene tetrahydrophthalic anhydride, phthalic acid and phthalic anhydride.

* * * * *